June 28, 1932.   R. K. LEE   1,865,116
MEANS FOR COUNTERACTING TORSIONAL VIBRATIONS
Original Filed April 7, 1927

Inventor
Roger K. Lee

By Blackmore, Spencer & Hill
Attorneys

Patented June 28, 1932

1,865,116

UNITED STATES PATENT OFFICE

ROGER KENNETH LEE, OF DETROIT, MICHIGAN, ASSIGNOR, BY MESNE ASSIGNMENTS, TO PACKARD MOTOR CAR COMPANY, OF DETROIT, MICHIGAN, A CORPORATION OF MICHIGAN

MEANS FOR COUNTERACTING TORSIONAL VIBRATIONS

Application filed April 7, 1927, Serial No. 181,764. Renewed March 16, 1931.

This invention appertains to means for neutralizing torsional vibrations due to resonance in counterweighted crank shafts and is intended particularly for crank shafts of relatively high speed internal combustion engines used in motor vehicles.

In attempting to place the crank shaft of a high speed, multicylinder, internal combustion engine in complete dynamic balance by means of counterweights, a difficulty frequently encountered is that fundamental resonance occurs within the speed range of the engine. The added weight lowers the frequency of the torsional vibrations of the shaft to a degree that piston thrusts may, at high speeds, synchronize with every complete vibration cycle. In this case the disturbance is violent and hard to remedy by application of vibration dampers.

In application Ser. No. 98,774, filed by Caleb E. Summers, there is disclosed and claimed a counterweighted crank shaft, wherein one of the counterweights may function also as a vibration neutralizer.

Where a counterweight can be used also as a vibration neutralizer, there is an advantage in that the shaft does not have to be further loaded in order to cancel vibration.

Where a counterweight acts also as a vibration neutralizer there may be some difficulty in calibrating the vibratory counterweight to the particular crank shaft to which it is to be applied. In order to avoid such difficulties it is proposed in accordance with this invention to divide a counterweight into two or more parts, one of which shall be fixed to the crank shaft and the other elastically mounted on the fixed part. Thus, the total mass of the counterweight, which must be equal to the total mass of the counterweight which it balances, may be divided in any suitable proportion so that the vibratory portion or portions may be made of any mass and so mounted as may be found necessary to damp resonant vibrations of the crank shaft. The shaft is also simplified for the reason that a mass additional to counterweights is not needed.

Figure 1:
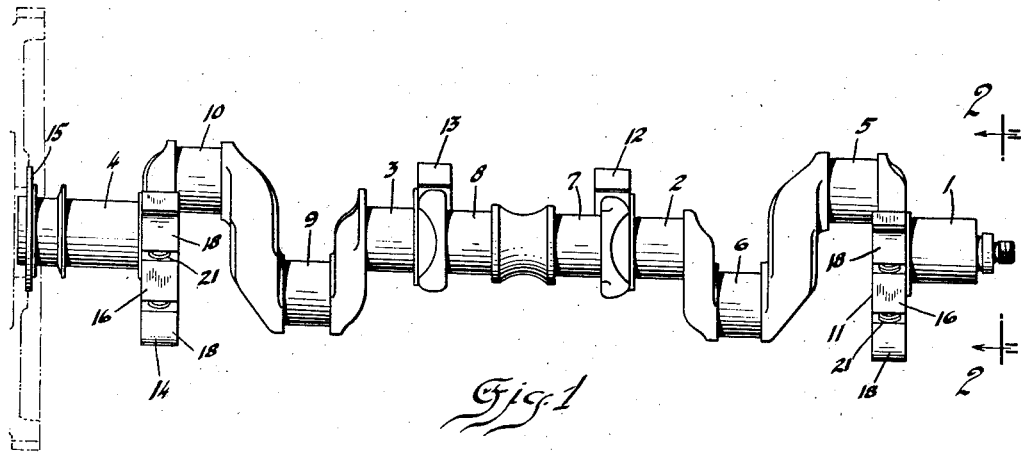
Figure 2:
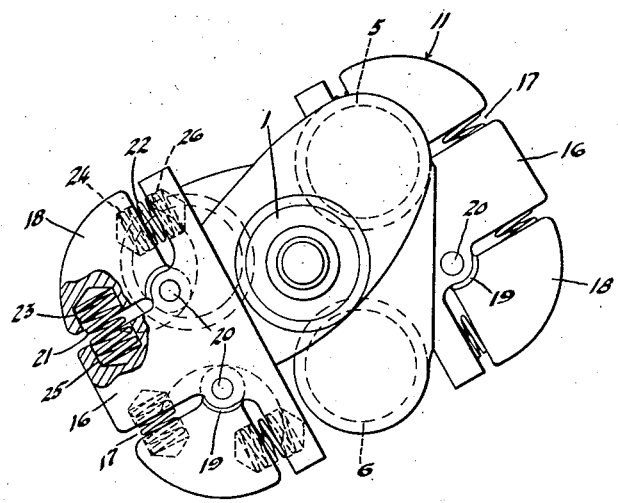

In the accompanying drawing, in which similar reference characters indicate like parts throughout the several views, Fig. 1 is an elevation of a six throw, counterweighted crank shaft made in accordance with this invention, and Fig. 2 is an enlarged section on the line 2—2 of Fig. 1, disclosing one specific embodiment of a combined counterweight and vibration neutralizer.

The shaft selected for illustrative purposes is a six-throw shaft in mirror symmetry on opposite sides of a transverse plane midway the end journals, having four journals, 1, 2, 3, 4, and six crank pins, 5, 6, 7, 8, 9 and 10, a type well adapted for use in motor cars. The particular shaft illustrated would be in static balance without counterweights. Counterweights 11, 12, 13 and 14 have been added in order to approximately balance the centrifugal couples developed in this shaft when rotating. The flange 15 is assumed to be at the rear end of the shaft as it is mounted in the car, and provides for attachment of a fly wheel at this end. The journal 1 is therefore at the front end of the shaft.

As the rear end of the shaft is steadied by a relatively heavy fly wheel, the front end will vibrate with the greater amplitude when resonance occurs. It is therefore desirable to place the vibration neutralizer at the front end of the shaft. For this reason the counterweight 11 has been selected as the one to be divided into parts, one of which is fixed to or rigid with the crank shaft, while another is resiliently mounted upon it.

The fixed part of the counterweight 11 is designated in Fig. 2 by the numeral 16. Of course part 16 may be integral with the shaft, but for manufacturing purposes it is better to have it attachable and rigidly affixed. The counterweight 11 and the remaining counterweights will be of such total mass, such distance from the axis of the crank shaft and at such angular positions as will be found necessary upon calculation or experiment in order to place the shaft in adequate dynamic balance. The part 16 in the example shown is of general T formation, having quadrant spaces or "cut-outs" 17 between the shank of the T and the cross member thereof, which cross member is nearer the shaft axis. Within these quadrant spaces are pivoted masses 18, capable of vibrating. In the construction shown grooves are milled in the part 16 at the inner angles of the quadrants between projections 19. These projections 19 constitute pivot lugs. The vibratory body 18, has a lug adapted to be fitted between the lugs 19,—all three being perforated to receive a pivot pin 20.

In order to mount the vibratory bodies 18 elastically, springs 21 and 22 are interposed between the fixed member 16 and each of the members 18. In the form shown coil springs are used, spring sockets 23 and 24 having been formed in the members 18 and corresponding sockets 25 and 26 in the member 16. The center of mass of each vibratory member 18 in the embodiment illustrated is located at one side of the radial plane through the axis of the shaft and the axis of the pivot pin 20. Because of this arrangement, centrifugal force, when the crank shaft is rotating, tends to rock each mass 18 toward the shank of the T shaped part 16 in the effort to pull the center of mass of said parts 18 into said radial plane. For this reason it has been thought desirable to make the springs 21 stiffer or more resistant to compression than springs 22.

Upon the inception of torsional vibration in the crank-shaft, the portions 18, because of their inertia, will be unable to follow the rapid oscillatory movement, so that an oscillatory movement of these members relative to the shaft will be set up, which movement, by reason of the energy losses which it entails, will effectively damp the vibration and prevent the resonant growth thereof.

Although I have shown and described a specific embodiment of my invention, it is not intended that patent protection shall be limited to said specific embodiment, as the principle thereof may be applied in many different forms.

What I claim is:

1. A crank shaft equipped with a counterweight having one portion rigid with the shaft and another portion movably mounted on said rigid portion so as to be capable of vibrating transversely of the shaft in response to torsional vibrations and to centrifugal force, and springs to oppose said vibratory movement.

2. A crank-shaft equipped with a counterweight having one portion rigid with the shaft, and another portion pivoted to the rigid portion on an axis parallel with the crank-shaft axis to vibrate in response to torsional vibration, and opposed springs of different strength between said rigid and pivoted portions.

3. A crank-shaft equipped with a counterweight having one portion rigid with the shaft and another portion elastically mounted on the rigid portion to vibrate transversely of the shaft axis in response to torsional vibration, and movable in response to centrifugal force.

4. A crankshaft equipped with a counterweight, a portion of which is mounted so as to permit it to vibrate transversely of the shaft axis, and to have its center of mass at one side of a radial plane intersecting the axis of said portion, that is adapted to vibrate and the crank shaft axis; springs on opposite sides of the vibratory portion, one of said springs exerting greater elastic force than the other and so placed as to resist the tendency of centrifugal force to move the center of mass into said radial plane.

5. A crankshaft equipped with a counterweight having a portion rigid with the shaft said portion having a cut-out; and a vibratory portion having its center of mass offset from the axis of the crank shaft resiliently mounted in said cut-out in such manner that it may vibrate transversely of the shaft axis.

6. A crankshaft equipped with a counterweight having a cut-out on each side of its mass center, said portion having the cut-outs being rigid with the shaft; and vibratory portions movably mounted on the rigid portion in the cut-outs and resiliently connected thereto whereby they may vibrate transversely of the shaft axis.

7. A crank shaft equipped with a counterweight having a portion rigid with the shaft, oppositely disposed portions pivoted on opposite sides of said rigid portion and having their centers of gravity disposed off the plane containing the crank shaft axis and the pivotal axis, and spring means of unequal strength disposed on each side of each movable portion.

8. A crank shaft equipped with a counterweight having a portion rigid with the shaft, a portion pivoted thereto for oscillation about an axis parallel to the shaft axis and having its center of gravity offset from the radial line of pull of centrifugal force, whereby said force exerts a turning moment on said movable portion, springs of unequal strength on each side of said portion tending to resist movement and to compensate for said moment.

9. A crank shaft equipped with a counterweight having a portion rigid with the shaft, a pair of oppositely disposed portions pivoted to said rigid portion and disposed to approach each other in response to an increase of centrifugal force, and opposed springs associated with each of the pivoted portions adapted to return said portions to their initial position after movement therefrom, those springs which oppose the centrifugal force being heavier than the other springs.

10. A crank shaft equipped with a counterweight having a portion rigid with the shaft, a portion mounted on the rigid portion for movement in response to torsional vibration and to centrifugal force, and springs of unequal strength adapted to oppose movement of said portion, the stronger spring being disposed to resist the movement due to centrifugal force 11. A crank shaft equipped with a counterweight having a portion rigid with the shaft, a portion mounted on the rigid portion for oscillatory movement in both directions in response to torsional vibration and in one direction in response to centrifugal force, and springs of unequal strength to oppose said movement, the spring of greater strength being disposed to resist the movement due to combined torsional vibration and centrifugal force.

12. A crankshaft equipped with a counterweight having one portion thereof rigid with the shaft and another portion having its center of mass offset from the axis of the crankshaft mounted on said rigid portion and movable with respect thereto in response to crankshaft vibrations, and means for retarding such movement.

13. A crankshaft having a counterweight rigid therewith, a vibration neutralizing body pivotally mounted on said counterweight for movement relative thereto in response to crankshaft vibrations, the center of mass of said body being disposed outside of the plane containing the crankshaft axis and the pivotal axis of said body, and means associated with said body and acting to retard movement thereof.

In testimony whereof I affix my signature.

ROGER KENNETH LEE.